US009550381B2

(12) United States Patent
Niizeki et al.

(10) Patent No.: US 9,550,381 B2
(45) Date of Patent: Jan. 24, 2017

(54) TAPE CASSETTE

(71) Applicant: Brother Kogyo Kabushiki Kaisha, Nagoya-shi, Aichi-ken (JP)

(72) Inventors: Mariko Niizeki, Ichinomiya (JP); Tsutomu Kato, Nagoya (JP); Hisako Tonishi, Aichi-gun (JP); Khairul Fatasha Mohd, Anjo (JP); Masashi Iwamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 420 days.

(21) Appl. No.: 14/224,685

(22) Filed: Mar. 25, 2014

(65) Prior Publication Data

US 2014/0307038 A1 Oct. 16, 2014

(30) Foreign Application Priority Data

Apr. 15, 2013 (JP) ................................ 2013-084839
Apr. 15, 2013 (JP) ................................ 2013-084841

(51) Int. Cl.
*G03B 23/02* (2006.01)
*B41J 15/04* (2006.01)

(52) U.S. Cl.
CPC .................................. *B41J 15/044* (2013.01)

(58) Field of Classification Search
CPC ....... B41J 11/009; B41J 15/044; B41J 3/4075; B41J 32/00; B41J 33/14
See application file for complete search history.

(56) References Cited

U.S. PATENT DOCUMENTS 7,121,751 B2 10/2006 Harada et al.
7,686,527 B2 3/2010 Harada et al.
7,726,893 B2 6/2010 Harada et al.
(Continued)

FOREIGN PATENT DOCUMENTS

CN 101934647 A 1/2011
CN 102019776 A 4/2011
(Continued)

OTHER PUBLICATIONS

Oct. 30, 2015—(CN) Notification of First Office Action—App 201410123960.7.

(Continued)

*Primary Examiner* — William A Rivera
(74) *Attorney, Agent, or Firm* — Banner & Witcoff, Ltd.

(57) ABSTRACT

A tape cassette includes a cassette case, a tape containment area, a first wall portion, a guide portion, a second wall portion, a third wall portion, and a fourth wall portion. The cassette case includes a top face, a bottom face, a front face, and a pair of side faces. The tape containment area is an area in which a tape roll is accommodated. The first wall portion is provided along a portion of an outer perimeter of the tape containment area. The guide portion is provided downstream from the first wall portion on a feed path. The second wall portion is provided between the first wall portion and the guide portion. The third wall portion is provided on an opposite side of a tape from the second wall portion. The fourth wall portion is provided between the second wall portion and the guide portion.

14 Claims, 11 Drawing Sheets

(56) References Cited

U.S. PATENT DOCUMENTS

| | | | | |
|---|---|---|---|---|
| 8,382,389 | B2 * | 2/2013 | Yamaguchi | B41J 11/009 347/214 |
| 8,562,228 | B2 * | 10/2013 | Yamaguchi | B41J 11/009 400/207 |
| 8,740,482 | B2 * | 6/2014 | Yamaguchi | B41J 15/044 400/207 |
| 8,757,907 | B2 * | 6/2014 | Yamaguchi | B41J 15/044 400/207 |
| 8,770,877 | B2 * | 7/2014 | Yamaguchi | B41J 11/009 347/214 |
| 2006/0013634 | A1 | 1/2006 | Harada et al. | |
| 2010/0247206 | A1 | 9/2010 | Yamaguchi et al. | |
| 2010/0329764 | A1 | 12/2010 | Yamaguchi et al. | |
| 2011/0058884 | A1 | 3/2011 | Kato et al. | |
| 2012/0039651 | A1 | 2/2012 | Yamaguchi et al. | |
| 2012/0080550 | A1 | 4/2012 | Yamaguchi et al. | |
| 2013/0108347 | A1 | 5/2013 | Yamaguchi et al. | |
| 2013/0294807 | A1 | 11/2013 | Yamaguchi et al. | |
| 2014/0205351 | A1 | 7/2014 | Yamaguchi et al. | |
| 2014/0307038 | A1 | 10/2014 | Niizeki et al. | |

FOREIGN PATENT DOCUMENTS

| | | | |
|---|---|---|---|
| CN | 203805516 | U | 9/2014 |
| JP | H5-446 | | 1/1993 |
| JP | H07-164702 | A | 6/1995 |
| JP | H07-314831 | A | 12/1995 |
| JP | H08-39908 | A | 2/1996 |
| JP | H08-58211 | A | 3/1996 |
| JP | H11-105352 | A | 4/1999 |
| JP | 2004-025563 | A | 1/2004 |
| JP | 2009-148984 | A | 7/2009 |
| JP | 2009-149337 | A | 7/2009 |
| JP | 2010-099886 | A | 5/2010 |
| JP | 2010-125791 | A | 6/2010 |
| JP | 2011-206916 | A | 10/2011 |
| JP | 2012-030433 | A | 2/2012 |
| WO | 2006/033393 | A1 | 3/2006 |
| WO | 2010/113780 | A1 | 10/2010 |

OTHER PUBLICATIONS

Aug. 21, 2014 (EP) Extended Search Report—App. 14161390.1.
Jun. 29, 2016 (CN) Office Action—App 201410123960.7.

* cited by examiner

TAPE CASSETTE

CROSS-REFERENCE TO RELATED APPLICATION

This application claims priority to Japanese Patent Application Nos. 2013-084839 and 2013-084841, both filed Apr. 15, 2013. The contents of the foregoing applications are hereby incorporated herein by reference.

BACKGROUND

The present disclosure relates to a tape cassette that contains a tape that is a printing medium.

A tape cassette is known that contains a tape that is a printing medium. A tape cassette includes a tape area in a cassette case. A tape roll that is a wound tape that is the printing medium is contained in the tape area. The tape may be pulled off of the tape roll and may be fed along a feed path. A guide portion is provided on the feed path regardless of the amount of tape of the tape roll. The guide portion is in contact with the tape. A plurality of walls are provided between the tape roll and the guide portion. The plurality of walls shape the feed path for the tape.

SUMMARY

Embodiments provide a tape cassette that includes a cassette case, a tape containment area, a first wall portion, a guide portion, a second wall portion, a third wall portion, and a fourth wall portion. The cassette case includes a top face, a bottom face, a front face, and a pair of side faces. The pair of side faces extend in a front-rear direction that is a direction orthogonal to the front face. The tape containment area is an area, in the cassette case, in which a tape roll is accommodated. The tape roll is a wound tape that is a printing medium. The first wall portion is a wall portion provided along a portion of an outer perimeter of the tape containment area. The first wall portion is configured to shape a feed path for the tape that extends from the tape roll. The first wall portion includes a first edge portion that is an edge that faces a first surface of the tape. The first surface is one surface of the tape. The guide portion is provided downstream from the first wall portion on the feed path. The guide portion is configured to be in contact with the tape regardless of an amount of the tape of the tape roll accommodated in the tape containment area. The guide portion faces a second surface of the tape. The second surface is the other surface of the tape. The second wall portion is provided between the first wall portion and the guide portion. The second wall portion is configured to shape the feed path. The second wall portion includes a second edge portion that is an edge that faces the first surface of the tape. The third wall portion is provided on an opposite side of the tape from the second wall portion. The third wall portion is configured to shape the feed path. The third wall portion includes a third edge portion that is an edge that faces the second surface of the tape. The fourth wall portion is provided between the second wall portion and the guide portion. The fourth wall portion includes a fourth edge portion that is an edge that faces the first surface of the tape. The second edge portion is provided in a position along a straight line that connects the first edge portion and the fourth edge portion.

Embodiments also provide a tape cassette that includes a cassette case, a tape containment area, an arm portion, a ribbon winding spool, a path shaping portion, and a partition wall. The cassette case has a rectangular parallelepiped shape. The cassette case includes a top face, a bottom face, a front face, and a pair of side faces. The pair of side faces extend in a front-rear direction that is a direction orthogonal to the front face. The tape containment area is an area, in the cassette case, in which a tape roll is accommodated. The tape roll is a wound tape that is a printing medium. The arm portion includes a portion of the front face and is configured to guide the tape to an exit along a portion of a feed path. The portion of the feed path extends in parallel to the front face. The ribbon winding spool is provided between the arm portion and the tape containment area in the front-rear direction. The ribbon winding spool is configured to wind an ink ribbon used for printing on the tape. The tape containment area and the ribbon winding spool are positioned on a first diagonal line. The first diagonal line connects a pair of corner portions of the cassette case. The path shaping portion is provided in a position along an outer perimeter of the tape containment area. The path shaping portion is a portion that is configured to shape the feed path for the tape. The partition wall is provided between the ribbon winding spool and the tape roll. The partition wall extends from the path shaping portion along a portion of the outer perimeter of the tape containment area.

BRIEF DESCRIPTION OF THE DRAWINGS

Embodiments will be described below in detail with reference to the accompanying drawings in which.

DETAILED DESCRIPTION

An embodiment will be explained with reference to the drawings. A tape printer 1 and a tape cassette 30 according to the present embodiment will be explained. In the explanation of the present embodiment, the lower left side, the upper right side, the lower right side, the upper left side, the top side, and the bottom side in FIG. 1 respectively define the front side, the rear side, the right side, the left side, the top side, and the bottom side of the tape printer 1. The lower right side, the upper left side, the upper right side, the lower left side, the top side, and the bottom side in FIG. 2 respectively define the front side, the rear side, the right side, the left side, the top side, and the bottom side of the tape cassette 30.

In the present embodiment, the various types of tapes that may each be contained in the tape cassette 30 (for example, a heat-sensitive paper tape, a printing tape, the double-sided adhesive tape, a film tape, and a tube tape 57 that will be described below) are collectively referred to as the tapes. The types of the tapes that may each be contained in the tape cassette 30 (as defined by the tape width, the form of printing, the tape color, the character color, and the like, for example) are collectively referred to as the tape types.

Figure 2:
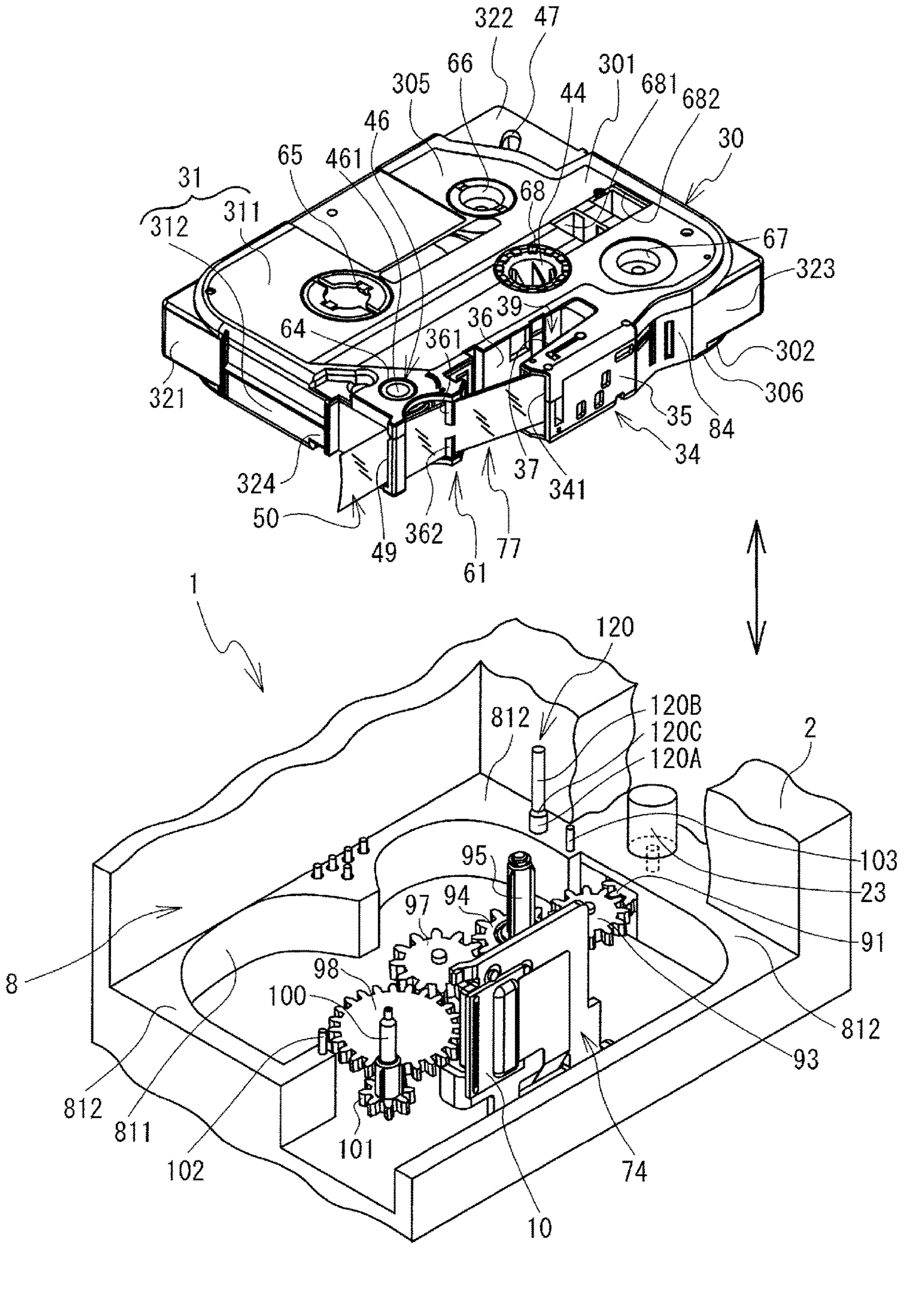
FIG. 2 is an oblique view for explaining a tape cassette 30 and a cassette mounting portion 8.
Figure 3:
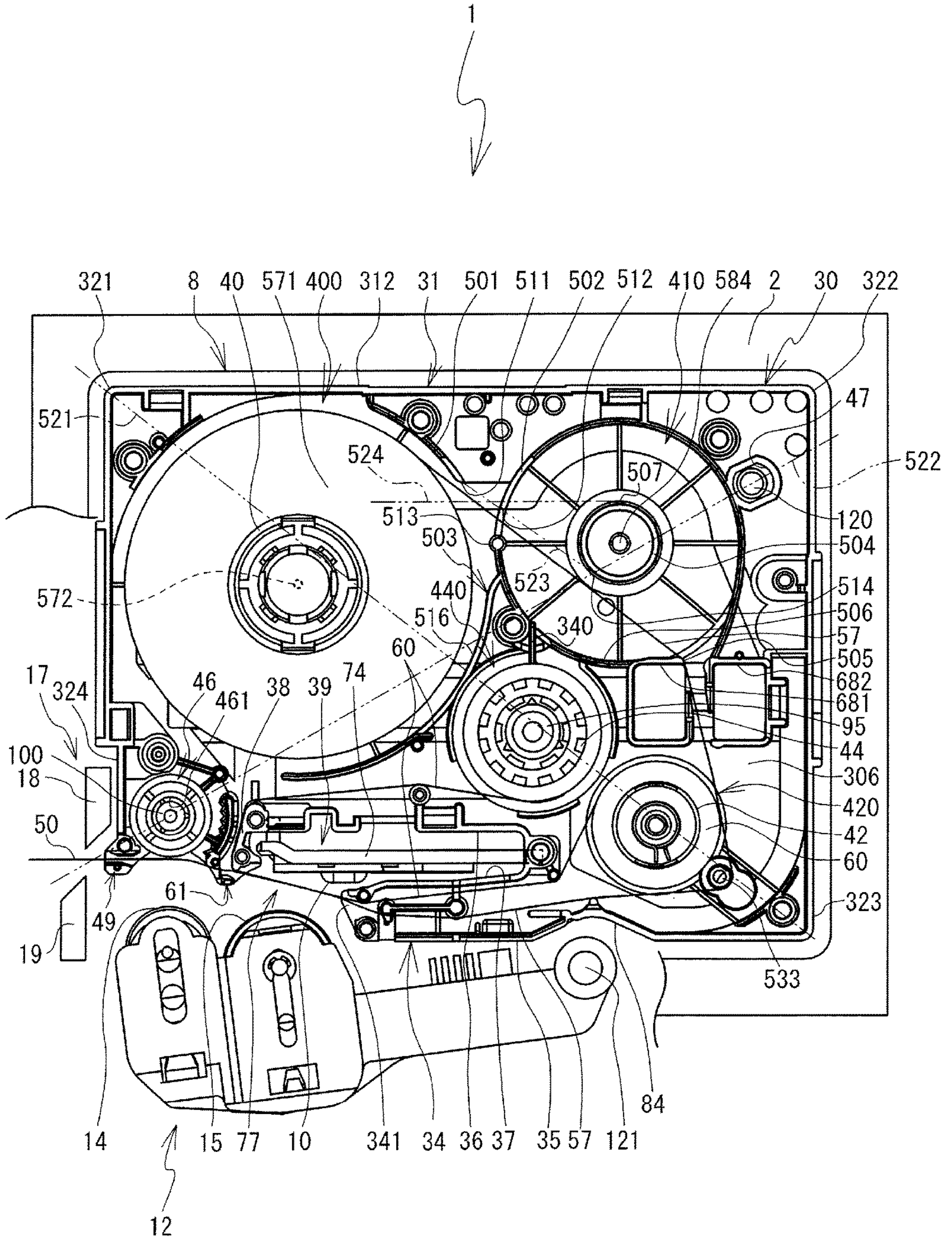
FIG. 3 is a plan view of the cassette mounting portion 8 in which a tube type of the tape cassette 30 has been mounted.

The tape printer 1 will be explained with reference to FIGS. 1 to 3. Side walls that form the perimeter of a cassette mounting portion 8 are shown in FIGS. 2 and 3. FIGS. 2 and 3 are schematic drawings, so to facilitate the explanation, the walls that are shown in FIGS. 2 and 3 are drawn to appear thicker than the walls actually are. A group of gears that includes gears 91, 93, 94, 97, 98, and 101, which are shown in FIG. 2, is actually covered and hidden by a bottom face of a cavity 811. The bottom face of the cavity 811 is not shown in FIG. 2, because of the need to explain the group of gears. A top case 311 of the tape cassette 30 has been removed in FIGS. 3 and 7.

The overall configuration of the tape printer 1 will be explained. The tape printer 1 is a general-purpose tape printer that can use various types of tape cassettes, such as a thermal type, a receptor type, a laminated type, a tube type, and the like. The thermal type of tape cassette includes the heat-sensitive paper tape. The receptor type of tape cassette includes the printing tape and an ink ribbon. The laminated type of tape cassette includes the double-sided adhesive tape, the film tape, and an ink ribbon. The tube type of tape cassette includes the tube tape and an ink ribbon.

Figure 1:
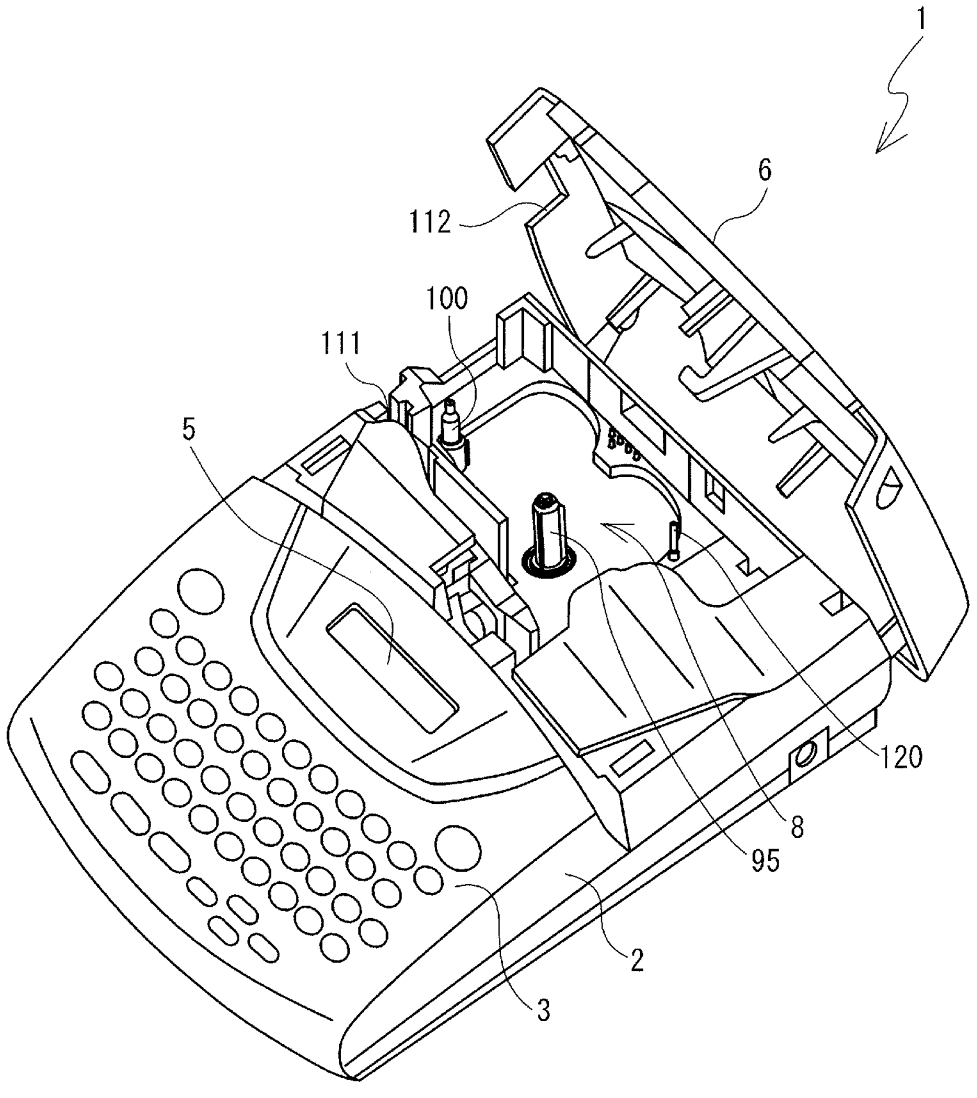
FIG. 1 is an oblique view of a tape printer 1 in a state in which a cassette cover 6 has been opened.

As shown in FIG. 1, the tape printer 1 includes a body cover 2 that has a substantially rectangular parallelepiped shape. A keyboard 3 is provided in the front portion of the top face of the body cover 2. The keyboard 3 includes character keys and function keys. A display 5 is provided to the rear of the keyboard 3. The display 5 is configured to display a character (a text character, a numeral, a figure, or the like) that is input via the keyboard 3. A cassette cover 6 is provided to the rear of display 5. The cassette cover 6 may be opened and closed when the tape cassette 30 (refer to FIG. 2) is replaced.

The cassette cover 6 is a lid portion that is substantially rectangular in a plan view. The cassette cover 6 is axially supported at left and right edges on the top of the rear face of the body cover 2. The cassette cover 6 is configured to rotate between a closed position, which is not shown in the drawings, and an open position, which is shown in FIG. 1. The cassette mounting portion 8 is provided in the interior of the body cover 2. The cassette mounting portion 8 is a portion that the tape cassette 30 can be mounted to and removed from. When the cassette cover 6 is in the closed position, the cassette mounting portion 8 is covered by the cassette cover 6. When the cassette cover 6 is in the open position, the cassette mounting portion 8 is exposed.

A discharge slit 111 is provided in the rear portion of the left side face of the body cover 2. The discharge slit 111 may discharge the printed tape from the cassette mounting portion 8. A discharge window 112 is provided in the left side face of the cassette cover 6. When the cassette cover 6 is closed, the discharge window 112 exposes the discharge slit 111 to the outside.

The internal configuration of the body cover 2 underneath the cassette cover 6 will be explained with reference to FIG. 2. As shown in FIG. 2, the cassette mounting portion 8 includes the cavity 811 and a corner support portion 812. The cavity 811 is a recessed portion that has a flat bottom surface that substantially corresponds to the shape of a bottom face 302 of a cassette case 31. The corner support portion 812 is a flat portion that extends horizontally from the outer edge of the cavity 811. In a case where the tape cassette 30 has been mounted in the cassette mounting portion 8, the corner support portion 812 supports the bottom face of the outer edge of the tape cassette 30.

Two positioning pins 102, 103 are provided in two locations on the corner support portion 812. Specifically, the positioning pin 102 is provided on the left side of the cavity 811. The positioning pin 103 is provided on the right side of the cavity 811. In a case where the tape cassette 30 has been mounted in the cassette mounting portion 8, the positioning pins 102, 103 are respectively inserted into pin holes (not shown in the drawings) in the bottom face 302 of the cassette case 31. At this time, the positioning pins 102, 103 position the tape cassette 30 in the front-rear direction and the left-right direction by positioning the left and right positions of the outer edge of the tape cassette 30.

A head holder 74 is provided in the front portion of the cassette mounting portion 8. A thermal head 10 is mounted on the head holder 74. The thermal head 10 includes a heating element (not shown in the drawings). In a case where the tape cassette 30 has been mounted in the cassette mounting portion 8, the head holder 74 is inserted into a head insertion portion 39 (refer to FIG. 3). A tape drive motor 23 is provided on the outer side of the cassette mounting portion 8 (on the upper right side in FIG. 2). The tape drive motor 23 is a stepping motor. The gear 91 is affixed to the lower end of a drive shaft of the tape drive motor 23. The gear 91 meshes with the gear 93 through an opening. The gear 93 meshes with the gear 94. The gear 94 meshes with the gear 97. The gear 97 meshes with the gear 98. The gear 98 meshes with the gear 101.

A ribbon winding shaft 95 is provided in a vertical orientation on a top face of the gear 94. The ribbon winding shaft 95 is a shaft that a ribbon winding spool 44 can be mounted on and removed from. A tape drive shaft 100 is provided in a vertical orientation on a top face of the gear 101. The tape drive shaft 100 is a shaft that a hole 461 of a tape drive roller 46 can be mounted on and removed from.

With the tape cassette 30 in the state of having been mounted in the cassette mounting portion 8, the tape feed motor 23 may rotationally drive the gear 91 in the counterclockwise direction. In this case, the ribbon winding shaft 95 may be rotationally driven in the counterclockwise direction via the gear 93 and the gear 94. The ribbon winding shaft 95 may rotationally drive the ribbon winding spool 44 that is mounted on the ribbon winding shaft 95. Furthermore, the rotation of the gear 94 may be transmitted to the tape drive shaft 100 via the gear 97, the gear 98, and the gear 101, such that the tape drive shaft 100 may be rotationally driven in the clockwise direction. The tape drive shaft 100 may rotationally drive the tape drive roller 46 that is mounted on the tape drive shaft 100.

A guide shaft 120 is provided in a vertical orientation in the rear portion of the right side of the cassette mounting portion 8. The guide shaft 120 is a shaft that can be inserted into and removed from a guide hole 47 in the tape cassette 30. The guide shaft 120 includes two shaft portions of different diameters (a large diameter portion 120A and a small diameter portion 120B) and a tapered portion 120C. The large diameter portion 120A is a shaft portion that forms a base end of the guide shaft 120. The large diameter portion 120A has the largest diameter in the guide shaft 120. The small diameter portion 120B is a shaft portion that forms a tip end of the guide shaft 120. The small diameter portion 120B has a smaller diameter than does the large diameter portion 120A. The tapered portion 120C is a shaft portion that is provided between the large diameter portion 120A and the small diameter portion 120B. The tapered portion 120C has a tapered face whose diameter gradually decreases from the large diameter portion 120A end toward the small diameter portion 120B end.

As shown in FIG. 3, an arm-shaped platen holder 12 is provided in front of the head holder 74. The platen holder 12 is supported such that the platen holder 12 can swing around a shaft support portion 121. On a leading end side of the platen holder 12, a platen roller 15 and a movable feed roller 14 are rotatably supported. The platen roller 15 is opposed to the thermal head 10, and is able to come into contact with and separate from the thermal head 10. The movable feed roller 14 is opposed to the tape drive roller 46 that is mounted on the tape drive shaft 100, and is able to come into contact with and separate from the tape drive roller 46.

A release lever that is not shown in the drawings is coupled to the platen holder 12. The release lever moves to the left and the right in conjunction with the opening and closing of the cassette cover 6. When the cassette cover 6 is opened, the release lever moves to the right, and the platen holder 12 moves toward a standby position that is shown in FIG. 3. In the standby position that is shown in FIG. 3, the platen holder 12 is separated from the cassette mounting portion 8. Therefore, a person can mount the tape cassette 30 in and remove the tape cassette 30 from the cassette mounting portion 8. The platen holder 12 is constantly elastically urged toward the standby position by a coil spring that is not shown in the drawings.

When the cassette cover 6 is closed, the release lever moves to the left, and the platen holder 12 moves rearward toward a printing position (not shown in the drawings). In the printing position, the platen holder 12 is close to the cassette mounting portion 8. Specifically, in a case where the tape cassette 30 of the tube type has been mounted in the cassette mounting portion 8, the platen roller 15 presses the tube tape 57 and an ink ribbon 60 against the thermal head 10. At the same time, the movable feed roller 14 presses the tube tape 57 against the tape drive roller 46. In the printing position, the tape printer 1 is able to perform printing using the tape cassette 30 that has been mounted in the cassette mounting portion 8.

As shown in FIG. 3, a cutting mechanism 17 is provided to the right of the discharge slit 111 (refer to FIG. 1). The cutting mechanism 17 may cut a printed tape 50 at a specified position. The cutting mechanism 17 includes a fixed blade 18 and a moving blade 19. The moving blade 19 is able to move in the front-rear direction (the up-down direction in FIG. 3) in an opposing position to the fixed blade 18.

Figure 4:
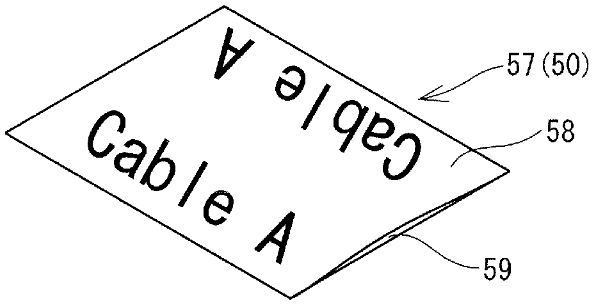
FIG. 4 is a figure for explaining a form in which a tube tape 57 is used.
Figure 5:
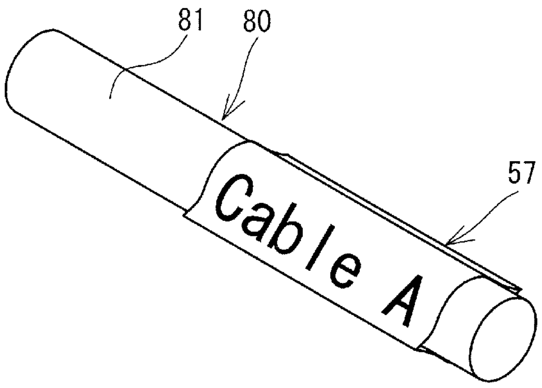
FIG. 5 is a figure for explaining the form in which the tube tape 57 is used.
Figure 6:
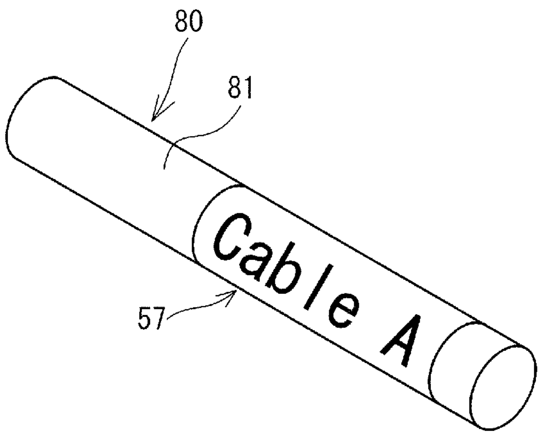
FIG. 6 is a figure for explaining the form in which the tube tape 57 is used.

The form in which the printed tube tape 57 (that is, the printed tape 50) is used will be explained with reference to FIGS. 4 to 6. FIG. 4 shows the printed tape 50 that is discharged from the discharge slit 111 after the tube tape 57, on which the characters "Cable A" have been printed in two locations, is cut by the cutting mechanism 17. The tube tape 57 is a long, tubular tape in which a shrinkable surface 59 and a non-shrinkable surface 58 are joined. The shrinkable surface 59 is a surface that is formed from a material that thermally shrinks when the material is heated. The non-shrinkable surface 58 is a surface that is formed from a material that does not shrink when the material is heated. The tube tape 57 is wound around a first tape spool 40 in a state in which the tube tape 57 has been pressed flat, with the non-shrinkable surface 58 serving as a printing surface and the shrinkable surface 59 serving as an opposite surface. FIG. 4 shows the printed tube tape 57 that is discharged from the tape cassette 30. A cable 80, which is the object on which the tube tape 57 is mounted, may be inserted into the tube tape 57 that is changed in a tubular shape, as shown in FIG. 5. Thereafter, the tube tape 57 into which the cable 80 has been inserted may be heated by a blow dryer or the like. The shrinkable surface 59 of the tube tape 57 may thus be shrunk, and the tube tape 57 may be affixed to an outer surface 81 of the cable 80, as shown in FIG. 6.

Figure 7:
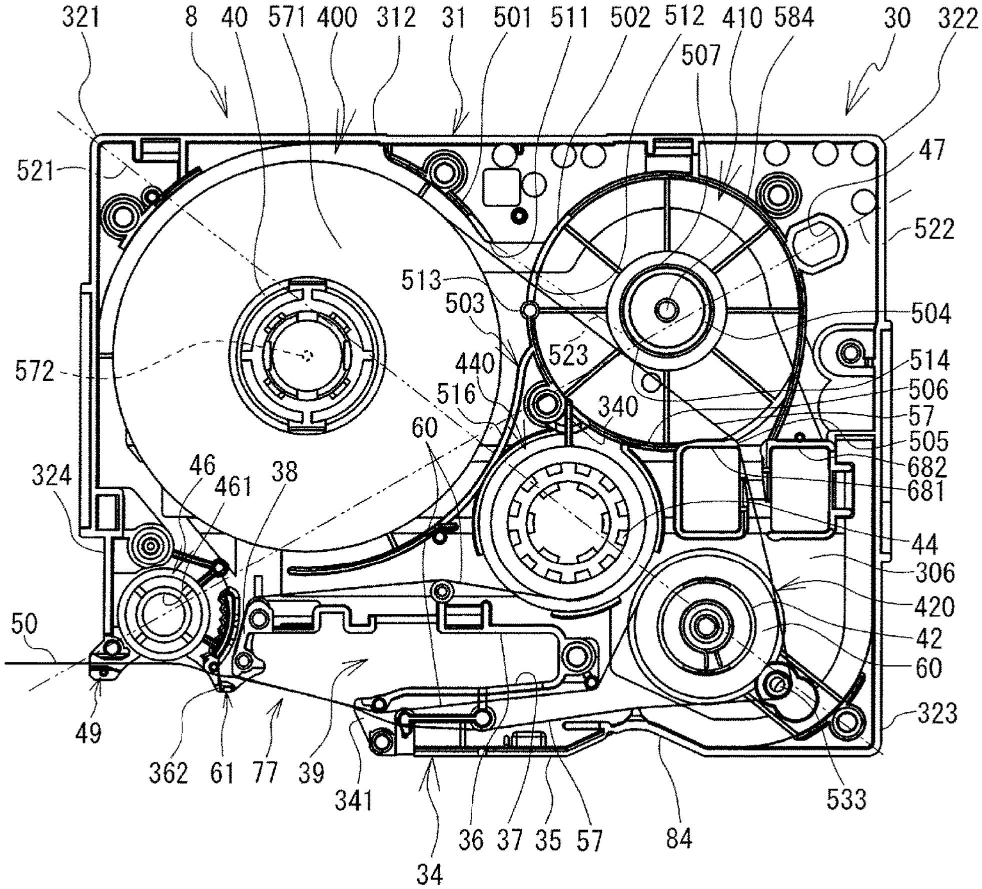
FIG. 7 is a plan view of the tube type of the tape cassette 30 in a state in which a top case 311 has been removed.
Figure 8:
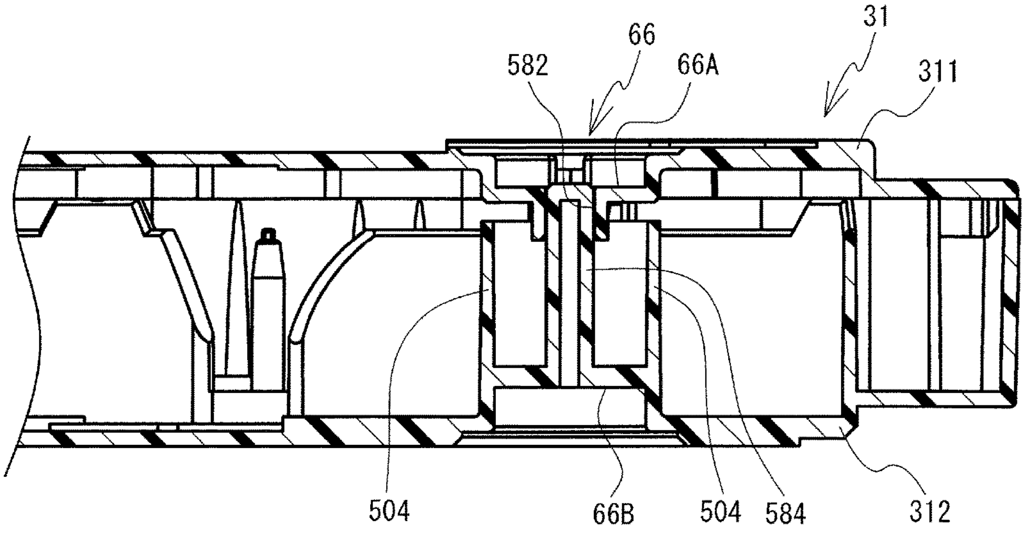
FIG. 8 is a vertical section view of an area including a second tape support hole 66, a wall 504, and a support shaft 584.

The tape cassette 30 will be explained with reference to FIG. 2 and FIGS. 7 to 10. In FIG. 8, to facilitate the explanation, the cassette case 31 is shown without the tapes and spools that are contained in the interior of the cassette case 31.

The overall configuration of the tape cassette 30 will be explained. The tape cassette 30 is a general-purpose cassette in which the previously described thermal type tape, receptor type tape, laminated type tape, and the like can be mounted by modifying, as desired, the type of the tape that is contained in the interior of the tape cassette 30, the presence or absence of an ink ribbon, and the like. In FIGS. 2 and 7, an example is shown of the tape cassette 30 with the tube type tape mounted in the tape cassette 30.

As shown in FIG. 2, the tape cassette 30 includes the cassette case 31, which is the housing of the tape cassette 30. The overall shape of the cassette case 31 is substantially rectangular (box-shaped), with corner portions that are rounded in a plan view. The cassette case 31 includes the top case 311 and a bottom case 312. The bottom case 312 includes a bottom plate 306. The bottom plate 306 forms the bottom face 302 of the cassette case 31. The top case 311 is affixed to the upper part of the bottom case 312 and includes a top plate 305. The top plate 305 forms a top face 301 of the cassette case 31.

The cassette case 31 according to the present embodiment is enclosed by a perimeter wall that forms a side face around the entire perimeter of the top plate 305 and the bottom plate 306. However, it is not absolutely necessary for the entire perimeter of the top plate 305 and the bottom plate 306 to be enclosed by the perimeter wall. For example, an opening that exposes the interior of the cassette case 31 to the outside may be provided in a portion of the perimeter wall (in a rear face, for example). A boss for connecting the top plate 305 and the bottom plate 306 may be provided in a position that faces the opening.

The cassette case 31 has four corner portions 321 to 324, regardless of the type of the tape in the tape cassette 30. The four corner portions 321 to 324 are all formed to have the same width (the same length in the up-down direction). In the explanation that follows, the left rear corner portion is referred to as the first corner portion 321, the right rear corner portion is referred to as the second corner portion 322, the right front corner portion is referred to as the third corner portion 323, and the left front corner portion is referred to as the fourth corner portion 324. The first to the third corner portions 321 to 323 project toward the outside from the side faces of the cassette case 31, such that the first to the third corner portions 321 to 323 form right angles in a plan view. The fourth corner portion 324 does not form a right angle, because a discharge guide portion 49 is provided at the corner of the fourth corner portion 324. When the tape cassette 30 has been mounted in the cassette mounting portion 8, the bottom faces of the corner portions 321 to 324 are portions that are supported by the corner support portion 812.

Four support holes 65 to 68 are provided in the cassette case 31. The support holes 65 to 68 is configured to support the spools that are mounted in the cassette case 31 such that the spools can rotate. In the explanation that follows, the holes that are provided in the left rear portion, the right rear portion, and the right front portion of the cassette case 31 are referred to as the first tape support hole 65, the second tape support hole 66, and the ribbon support hole 67, respectively. The hole that is provided between the first tape support hole 65 and the ribbon support hole 67 in a plan view is referred to as the winding spool support hole 68.

The first tape support hole 65 may rotatably support the first tape spool 40 (refer to FIGS. 3 and 7). The ribbon support hole 67 may rotatably support a ribbon spool 42 (refer to FIGS. 3 and 7). The winding spool support hole 68 may rotatably support the ribbon winding spool 44 (refer to FIGS. 3 and 7). A clutch spring 340 (refer to FIGS. 3 and 7) is attached to a lower portion of the ribbon winding spool 44. The clutch spring 340 is a coil spring. The clutch spring 340 is configured to prevent the ink ribbon 60 that has been wound up by the ribbon winding spool 44 from being loosened by the reverse rotating of the ribbon winding spool 44. In a case where the tape cassette 30 is the laminated type, for example, the second tape support hole 66 may rotatably support a second tape spool, although that is not shown in the drawings. A film tape, which is a printing medium, may be wound around the second tape spool.

As shown in FIG. 8, the second tape support hole 66 includes a top tape support portion 66A and a bottom tape support portion 66B. The top tape support portion 66A is a circular portion where the top plate 305 that projects downward. The bottom tape support portion 66B is a circular portion where the bottom plate 306 projects upward. The top tape support portion 66A and the bottom tape support portion 66B are provided in corresponding positions in the up-down direction of the cassette case 31.

A shaft hole 582 is provided in the central portion of the top tape support portion 66A in a plan view. The shaft hole 582 passes through the top plate 305 in the up-down direction. A support shaft 584 that extends upward is provided in a vertical orientation in the central portion of the bottom tape support portion 66B in a plan view. The top tape support portion 66A and the bottom tape support portion 66B are coupled by fitting the upper end of the support shaft 584 into the shaft hole 582. A wall 504 (refer to FIGS. 8 and 10) is provided on the top face of the bottom tape support portion 66B. The wall 504 is cylindrical and extends upward from the perimeter edge of the bottom tape support portion 66B.

As shown in FIGS. 3, 7, 9, and 10, a first tape area 400, a second tape area 410, a first ribbon area 420, and a second ribbon area 440 are provided within the cassette case 31. The first tape area 400 and the second tape area 410 are each areas that can accommodate a tape. The first tape area 400 is an area that is adjacent to the first corner portion 321 and is substantially circular in a plan view. The first tape area 400 occupies almost all of the left half of the cassette case 31. The second tape area 410 is an area that is adjacent to the second corner portion 322 and is substantially circular in a plan view. The second tape area 410 is provided in the right rear portion of the cassette case 31.

The first ribbon area 420 is an area that can accommodate the unused ink ribbon 60. The first ribbon area 420 is adjacent to the third corner portion 323 and the head insertion portion 39. The first ribbon area 420 is provided in the right front portion of the cassette case 31. The second ribbon area 440 is an area that can accommodate the ink ribbon 60 after the ink ribbon 60 has been used for printing (hereinafter referred to as the used ink ribbon 60). The second ribbon area 440 is provided between the first tape area 400 and the first ribbon area 420 in the cassette case 31. The second ribbon area 440 is positioned between an arm portion 34 and the first tape area 400 in the front-rear direction. The first tape area 400, the second ribbon area 440, and the first ribbon area 420 are positioned on a first diagonal line 521 (refer to FIGS. 3 and 7). The first diagonal line 521 connects a pair of corners: the first corner portion 321 and the third corner portion 323. In a plan view, the support holes 65 to 68 (refer to FIG. 2) are provided approximately in the centers of the first tape area 400, the second tape area 410, the first ribbon area 420, and the second ribbon area 440, respectively.

Rectangular cassette holes 681, 682 are provided to the right of the second ribbon area 440 and in front of the second tape area 410. The rectangular cassette holes 681, 682 are a pair of rectangular holes whose longer axes extend in the front-rear direction in a plan view. The perimeters of the rectangular cassette holes 681, 682 are each defined by a wall that extends upward from the bottom plate 306 of the bottom case 312. The pair of the rectangular cassette holes 681, 682 are lined up from left to right with a specified gap between the rectangular cassette holes 681, 682. The rectangular cassette hole 681 is positioned to the left of the rectangular cassette hole 682. Openings are provided in the walls of the rectangular cassette holes 681, 682 that are opposed to one another (not shown in the drawings).

In the case of the tube type of the tape cassette 30, a tape roll 571 that is the wound tube tape 57 is accommodated in the first tape area 400, as shown in FIGS. 3 and 7. A tape is not accommodated in the second tape area 410. The ribbon spool 42 around which the ink ribbon 60 is wound is accommodated in the first ribbon area 420. The ribbon winding spool 44 is accommodated in the second ribbon area 440. The ink ribbon 60 is wound around the ribbon winding spool 44 after being used for printing.

The tube tape 57 is pulled out from the tape roll 571 at a point that is to the rear of a winding center 572 of the tape roll 571 in the front-rear direction. In the tape cassette 30 that is shown in FIGS. 3 and 7, the tube tape 57 is pulled out toward the right front from the right rear portion of the tape roll 571. A feed path for the tube tape 57 is formed by at least walls 501, 502, 503, 504, and a guide portion 505. The wall 501 is provided along the outer circumference of the first tape area 400. The wall 501 extends upward from the bottom plate 306 of the bottom case 312. More specifically, the wall 501 is provided in an arc shape that extends toward the right rear of the first tape area 400 from a position that is slightly to the right of the rear side of the first tape area 400. The height of the right portion of the wall 501 in the up-down direction decreases toward the right side (refer to FIG. 10).

The guide portion 505 is the right rear corner portion of the wall that defines the rectangular cassette hole 681. The guide portion 505 is positioned downstream from the wall 501 along the feed path. The guide portion 505 is in contact with the tube tape 57 regardless of the amount of the tube tape 57 of the tape roll 571 that is contained in the first tape area 400. The wall 502 is provided between the wall 501 and the guide portion 505. More specifically, the wall 502 is provided in an arc shape that extends from a position that is slightly to the rear of the left side of the second tape area 410, along the rear side of the second tape area 410, and toward the right front. The left portion of the wall 502 is positioned between the wall 501 and the guide portion 505. The height of the left portion of the wall 502 in the up-down direction decreases toward the left side (refer to FIG. 10). The right front end of the wall 502 is connected to the left rear portion of the rectangular cassette hole 682.

The wall 503 is provided in a position along the outer circumference of the first tape area 400, on the opposite side of the tube tape 57 that is positioned along the feed path from the wall 502. The wall 503 includes a columnar portion 513 and a partition wall 516. The columnar portion 513 is a right end portion of the wall 503. The columnar portion 513 is positioned to the right of the first tape area 400. The columnar portion 513 extends upward from the bottom plate 306 of the bottom case 312.

The partition wall 516 extends from the columnar portion 513 along the outer circumference of the first tape area 400. A second diagonal line (not shown in the drawings) intersects the first diagonal line 521. The second corner portion 322 and the fourth corner portion 324 are positioned on the second diagonal line. The partition wall 516 extends along a virtual line 522. The virtual line 522 connects the hole 461 of the tape drive roller 46, which is provided in the fourth corner portion 324, and the guide hole 47, which is provided in the second corner portion 322. More specifically, the virtual line 522 extends toward the right rear from the hole 461 toward the guide hole 47. Starting from its left end, the partition wall 516 extends along the virtual line 522 in an arc shape toward the right rear, intersecting the virtual line 522 in a central portion of the tape cassette 30, then extending along the virtual line 522 toward the right rear. The rear end of the partition wall 516 is integrated with the rear end of a wall 506. The wall 506 is provided along the outer circumference of the second tape area 410. The wall 506 is provided in an arc shape from the left side to the front side of the second tape area 410.

The edges of the walls 501, 502, 504 that face the tube tape 57 that is being fed along the feed path are respectively referred to as the edge portions 511, 512, 514. The edge portions 511, 512, 514 extend in the up-down direction (refer to FIG. 10). The columnar portion 513 is an edge of the wall 503 that faces the tube tape 57 that is being fed along the feed path. The edge portions 511, 512, 514 face one surface of the tube tape 57 (the shrinkable surface 59 in FIG. 4). The columnar portion 513 and the guide portion 505 face the other surface of the tube tape 57 (the non-shrinkable surface 58 in FIG. 4). The edge portion 512 is provided on a virtual line 523 that connects the edge portion 511 and the edge portion 514. In other words, the edge portions 511, 512, 514 are lined up along the virtual line 523.

As shown in FIGS. 3 and 7, a bending portion 533 is provided in a vertical orientation in the right front corner of the cassette case 31, specifically, on the right front side of the first ribbon area 420. The feed path of the tube tape 57 that has been pulled out from the tape roll 571 bends at the guide portion 505, passes between the rectangular cassette holes 681, 682, and extends toward the bending portion 533. The bending portion 533 is a pin that causes the feed path of the tube tape 57 to bend into an acute angle along the outer circumference of the first ribbon area 420. The tape that is fed toward the right front corner of the cassette case 31 passes along the bending portion 533 and is fed toward the left front corner of the cassette case 31, being guided into the arm portion 34, which will be described below.

As shown in FIGS. 2, 3, 7, 9, and 10, a semi-circular groove 84 is provided on the front surface of the cassette case 31. The semi-circular groove 84 that is a groove is substantially semi-circular in a plan view. The semi-circular groove 84 is provided such that the semi-circular groove 84 spans the up-down direction of the cassette case 31. The semi-circular groove 84 is a cut-out that serves to prevent the shaft support portion 121 of the platen holder 12 from interfering with the cassette case 31 when the tape cassette 30 has been mounted in the cassette mounting portion 8.

The portion of the front surface wall of the cassette case 31 that extends to the left from the semi-circular groove 84 is an arm front surface wall 35. A wall that is provided such that the wall spans the up-down direction of the cassette case 31 in a position that is separated from and to the rear of the arm front surface wall 35 is an arm rear surface wall 37. The portion that extends to the left from the right front portion of the tape cassette 30 and that is defined by the arm front surface wall 35 and the arm rear surface wall 37 is the arm portion 34. The left end of the arm front surface wall 35 is bent toward the rear. A gap that extends in the up-down direction between the left ends of the arm front surface wall 35 and the arm rear surface wall 37 is an exit 341.

A perimeter wall that extends toward the rear from the right end of the arm rear surface wall 37 and then extends parallel to the arm rear surface wall 37 is a head perimeter wall 36. A space that is defined by the arm rear surface wall 37 and the head perimeter wall 36, that is substantially rectangular in a plan view, and that extends through the up-down direction of the tape cassette 30 is the head insertion portion 39. An open portion 77 is provided in the front surface of the tape cassette 30. The head insertion portion 39 is connected to the outside on the front face side of the tape cassette 30 through the open portion 77. The head holder 74 may be inserted into the head insertion portion 39. The head holder 74 supports the thermal head 10.

A separator portion 61 is provided to the left of the head insertion portion 39. The separator portion 61 is a portion that is configured to separate the tube tape 57 and the ink ribbon 60 that have been used for printing, on the downstream side of the open portion 77 in the tape feed direction. The separator portion 61 includes restraining members 361, 362, a ribbon guide wall 38, and the like.

Figure 9:
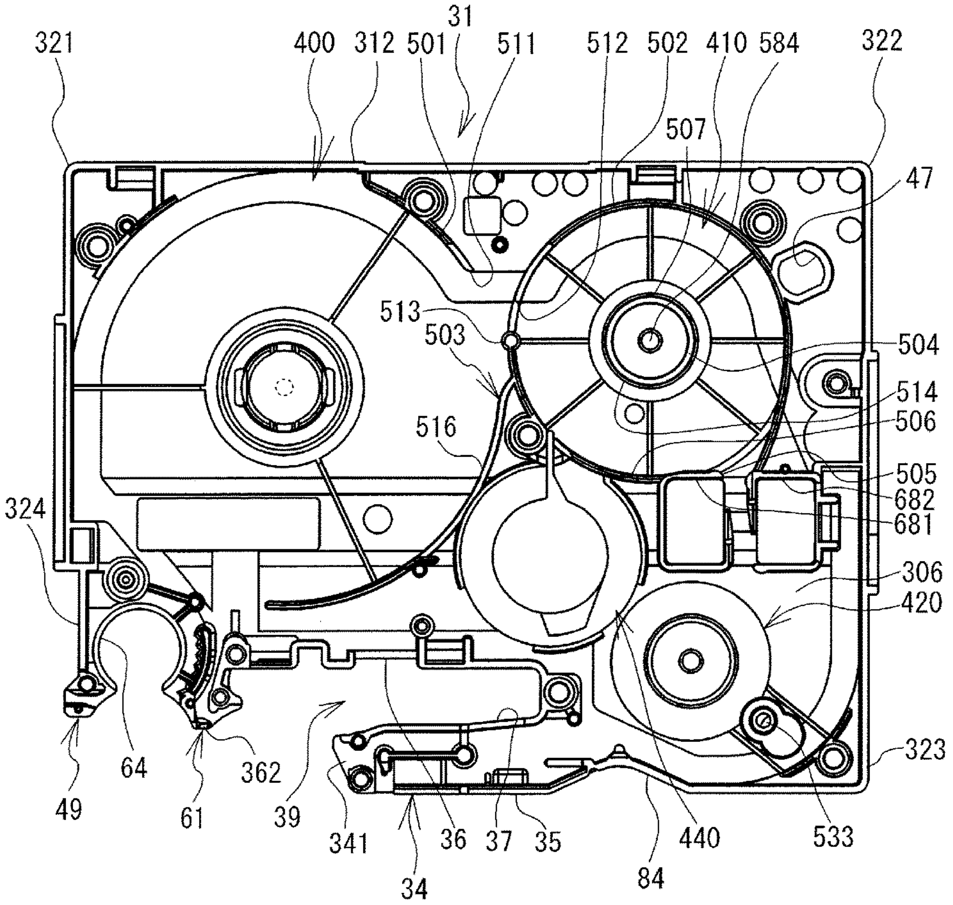
FIG. 9 is a plan view of a bottom case 312.
Figure 10:
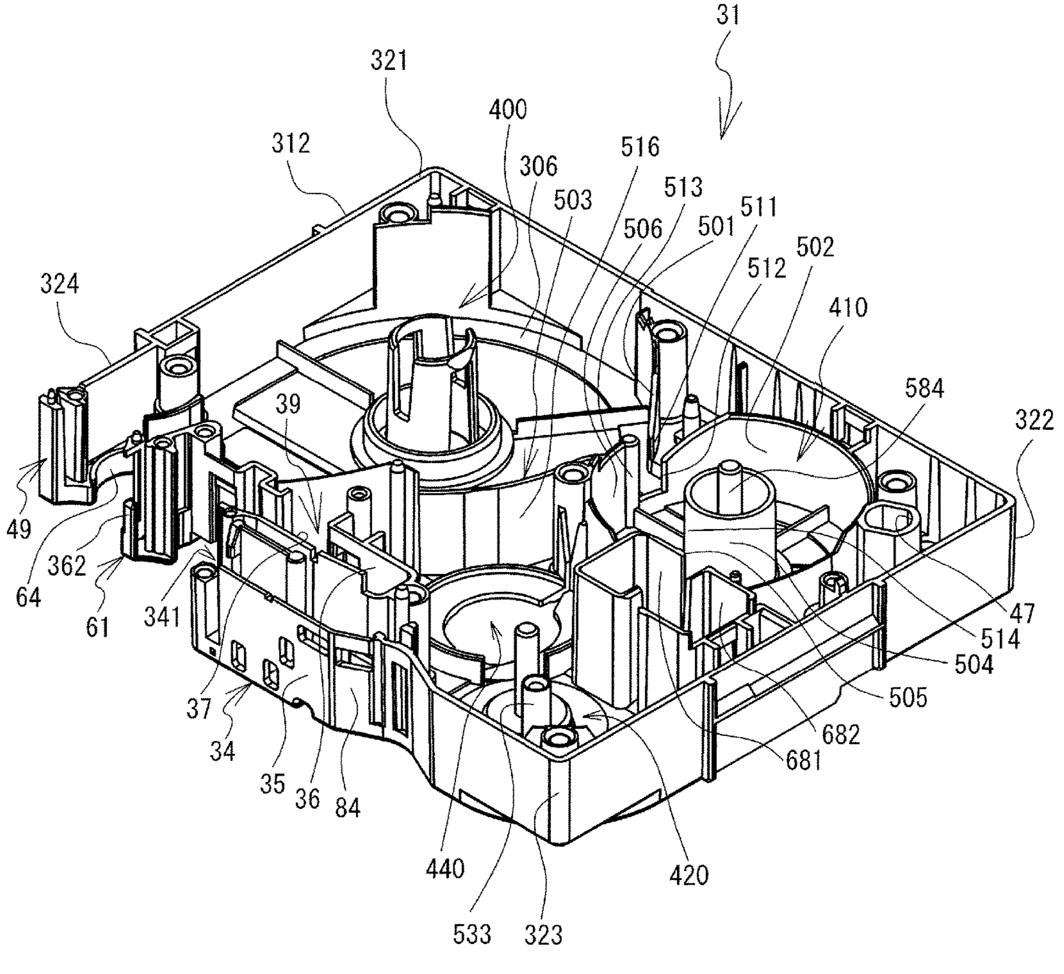
FIG. 10 is an oblique view of the bottom case 312.

As shown in FIGS. 2, 9, and 10, a roller support hole 64 is provided to the left of the separator portion 61 (that is, on the downstream side in the tape feed direction). The tape drive roller 46 is rotatably supported on the inner side of the roller support hole 64 (refer to FIG. 2). The surface on the front side of the tape drive roller 46, which is a portion of the outer circumferential surface of the tape drive roller 46, is exposed to the outside of the cassette case 31 and is into contact with the tube tape 57.

As shown in FIGS. 2, 3, 7, 9, and 10, the discharge guide portion 49 is provided on the downstream side of the roller support hole 64 in the feed direction. The discharge guide portion 49 is provided such that the discharge guide portion 49 is in front of and slightly separated from the front edge of the left side face of the cassette case 31. The discharge guide portion 49 is a plate-shaped member that extends between the top face 301 and the bottom face 302. The discharge guide portion 49 is configured to guide the printed tape 50 that has been fed past the tape drive roller 46 into a passage that is formed between the discharge guide portion 49 and the front edge of the left side face of the cassette case 31. The printed tape 50 is discharged to the outside of the tape cassette 30 from the end of the passage.

The feeding and printing of the tape will be explained. In a case where the tube type of the tape cassette 30 has been mounted in the cassette mounting portion 8, as shown in FIG. 3, the tube tape 57 is pulled out from the tape roll 571 by the coordinated operations of the tape drive roller 46 and the movable feed roller 14. As the tube tape 57 is pulled out, the tape roll 571 rotates clockwise in a plan view. The tube tape 57 that has been pulled out from the tape roll 571 passes between the edge portion 512 and the columnar portion 513, enters the second tape area 410, and is directed toward the guide portion 505. The tube tape 57 is fed past the guide portion 505 and the bending portion 533 to the arm portion 34. At the same time, as the ribbon winding spool 44 is driven by the ribbon winding shaft 95, the ribbon winding spool 44 rotates counterclockwise in a plan view and pulls the ink ribbon 60 out from the ribbon spool 42. As the ink ribbon 60 is pulled out, the ribbon spool 42 rotates counterclockwise in a plan view. The ink ribbon 60 that has been pulled out from the ribbon spool 42 is fed toward the arm portion 34.

Within the arm portion 34, the tube tape 57 is guided along the feed path, which extends substantially in parallel to the arm front surface wall 35. The tube tape 57 is discharged from the exit 341 to the open portion 77. Within the arm portion 34, the ink ribbon 60 is guided along a feed path that is different from the feed path for the tube tape 57. The ink ribbon 60 is overlaid on the tube tape 57 and is discharged from the exit 341 to the open portion 77.

In the open portion 77, one surface of the tube tape 57 (the shrinkable surface 59 in FIG. 4) that has been discharged from the exit 341 is exposed to the front, and the other surface (the non-shrinkable surface 58 in FIG. 4) faces the thermal head 10. The thermal head 10 may use the ink ribbon 60 to print on the tube tape 57 that is positioned in the open portion 77.

After the printing is performed, the ink ribbon 60 is separated from the tube tape 57 by the separator portion 61 and is wound up on the ribbon winding spool 44. The printed tube tape 57, that is, the printed tape 50, is guided downstream in the tape feed direction by the restraining members 361, 362. The printed tape 50 passes between the tape drive roller 46 and the movable feed roller 14 and is fed to the discharge guide portion 49. The printed tape 50 is discharged to the outside from the discharge guide portion 49. The printed tape 50 that is shown in FIG. 4 may thus be created.

In the present embodiment, the respective edge portions 511, 512, 514 of the walls 501, 502, 504, which face the one surface of the tube tape 57, are lined up along the virtual line 523 that connects the edge portion 511 and the edge portion 514. Therefore, the tube tape 57 tends not to bend, even in a case where the tube tape 57 that is being fed comes into contact with the edge portions 511, 512, 514. Accordingly, it is possible to inhibit the friction force between the tube tape 57 and the edge portions 511, 512, 514 from increasing. The tube tape 57 may therefore be fed smoothly. The printing quality may be improved accordingly. In particular, in the present embodiment, in a case where the tape that is the printing medium is the heat-shrinkable tube tape 57, the tape is more elastic than a heat-sensitive paper tape or the like, for example. When the tape is more elastic, the tape may expand to the rear more readily and may come into contact with the edge portions 511, 512, 514 more easily. Even in that case, because the edge portions 511, 512, 514 are lined up along the virtual line 523, the tube tape 57 is tends not to bend. The tube tape 57 may therefore be fed more smoothly. In other words, in a case where the tube tape 57 is the printing medium, the effect of the tube tape 57 being fed more smoothly may be even greater.

The wall 504 is cylindrical. Therefore, in a case where the tube tape 57 comes into contact with the wall 504, the tube tape 57 comes into contact with a curved surface. Therefore, the friction force between the tube tape 57 and the wall 504 may be less than in a case where the tube tape 57 comes into contact with a bar that has a rectangular column shape, for example. The tube tape 57 may thus be fed more smoothly. The printing quality may be improved accordingly.

Because the columnar portion 513 is provided, the tube tape 57 may be fed more smoothly even if the tube tape 57 comes into contact with the columnar portion 513. The tube tape 57 is pulled out from the tape roll 571 at a point that is to the rear of the winding center 572 of the tape roll 571 in the front-rear direction. Furthermore, the columnar portion 513 is positioned to the rear of the winding center 572 of the tape roll 571 in the front-rear direction. In this case, the distance between the columnar portion 513 and the wall 502 (the edge portion 512) is shorter than it would be in a case where the columnar portion 513 is positioned in front of the winding center 572 of the tape roll 571. The diameter of the tape roll 571 varies as the amount of the tube tape 57 of the tape roll 571 varies. Even in this sort of case, the variation in the feed path for the tube tape 57 is limited to the short distance between the columnar portion 513 and the wall 502 (the edge portion 512). Accordingly, the variation in the feed path for the tube tape 57 is reduced. The tube tape 57 may thus be fed more smoothly, even in a case where the amount of the tube tape 57 of the tape roll 571 varies.

Furthermore, the distance between the columnar portion 513 and the tube tape 57 that has been pulled out from the tape roll 571 is shorter than it would be in a case where the columnar portion 513 is positioned in front of the winding center 572 of the tape roll 571. As the tube tape 57 is consumed, the diameter of the tape roll 571 becomes smaller. Even in this sort of case, the variation in the feed path for the tube tape 57 is reduced. The tube tape 57 may therefore be fed more smoothly.

The partition wall 516 separates the tape roll 571 from the ribbon winding spool 44. The ribbon winding spool 44 and the tape roll 571 are therefore inhibited from coming into contact even if the winding of the tape roll 571 becomes looser and the diameter of the tape roll 571 increases. Accordingly, the tape roll 571 can be inhibited from coming into contact with the ribbon winding spool 44, which would make it more difficult for the tape roll 571 to rotate. The tube tape 57 may therefore be reliably pulled out from the tape roll 571, and the printing quality may be improved.

In particular, in a case where the tube tape 57 is used, as it is in the present embodiment, the tape is more elastic than a heat-sensitive paper tape, or the like. For example, in the case of a tape that is not very elastic, if the winding of a tape roll becomes looser, the pulling out of the tape in order to feed the tape may cause the tape to be drawn tighter around the tape roll, such that the slack in the tape is taken up to some extent. However, if the tape is elastic and the winding of a tape roll becomes looser, the slack in the tape tends not to be taken up even if the tape is pulled out in order to be fed. Therefore, in a case where the partition wall 516 is not provided, there is a strong possibility that the tape roll 571 and the ribbon winding spool 44 come into contact. However, in the present embodiment, the partition wall 516 is provided, so the ribbon winding spool 44 and the tape roll 571 can be inhibited from coming into contact. It thus becomes possible to inhibit the tape roll 571 from becoming difficult to rotate. In other words, in a case where the tube tape 57 is the printing medium, the effect of being able to inhibit the tape roll 571 from becoming difficult to rotate may be even greater. Moreover, because the tube tape 57 is pulled out from the tape roll 571 more reliably, the printing quality may be ensured.

Furthermore, the first tape area 400 and the ribbon winding spool 44 are lined up along the first diagonal line 521.

It is therefore easier to ensure space inside the tape cassette 30 for accommodating the first tape area 400 and the ribbon winding spool 44 than it would be in a case where the first tape area 400 and the ribbon winding spool 44 are lined up in the front-rear direction or the left-right direction. Accordingly, the partition wall 516 can be positioned between the tape roll 571 and the ribbon winding spool 44 without increasing the overall size of the cassette case 31. Furthermore, because the space for accommodating the first tape area 400 and the ribbon winding spool 44 is easily ensured, the partition wall 516 can be provided without reducing the diameters of the tape roll 571 and the ribbon winding spool 44. Accordingly, the volumes of the tube tape 57 and the ink ribbon 60 can be ensured.

For example, in a case where there is a gap between the partition wall 516 and the columnar portion 513, there is a possibility that the expanded tube tape 57 comes into contact with the edge of the partition wall 516 that is adjacent to the gap. Therefore, there is a possibility that the tape roll 571 becomes difficult to rotate. In the present embodiment, the partition wall 516 extends from the columnar portion 513, so a gap is not formed. The tape roll 571 may thus rotate smoothly. Therefore, the printing quality may be improved.

In the tape cassette 30, the hole 461 is provided in the tape drive roller 46 in the fourth corner portion 324, and the guide hole 47 is provided in the second corner portion 322. When the tape cassette 30 is mounted in the cassette mounting portion 8, the tape drive shaft 100 is inserted into the hole 461, and the guide shaft 120 is inserted into the guide hole 47 (refer to FIG. 3). Therefore, the tape cassette 30 is mounted in the cassette mounting portion 8 as the hole 461 and the guide hole 47 are guided by the tape drive shaft 100 and the guide shaft 120. The partition wall 516 extends along the virtual line 522 that connects the hole 461 and the guide hole 47. Therefore, the center of gravity of the tape cassette 30 is closer to the virtual line 522 than it would be in a case where the partition wall 516 is not provided. The orientation of the tape cassette 30 therefore may become stable in a case where the tape cassette 30 is mounted in the cassette mounting portion 8 with the hole 461 and the guide hole 47 being guided by the tape drive shaft 100 and the guide shaft 120. Accordingly, the possibility may be reduced that the tape cassette 30 is tilted when the tape cassette 30 is mounted in the cassette mounting portion 8.

Hereinafter, modifications that can be made to the embodiment that is described above will be explained. For example, it is acceptable for the edge portion 512 not to be positioned precisely on the virtual line 523 that connects the edge portion 511 and the edge portion 514. The edge portion 512 may be provided in a position along the virtual line 523. For example, the edge portion 512 may be positioned between a virtual line 524 (refer to FIG. 3) and the virtual line 523. The virtual line 524 extends toward the left from a rear edge 507 of the cylindrical wall 504. In a case where the edge portion 512 is positioned between the virtual line 524 and the virtual line 523, it is assumed that the tube tape 57 is positioned such that the tube tape 57 passes around the rear edge 507 of the cylindrical wall 504, due to a mistake during manufacturing. In that case, the tube tape 57 that is pulled out from the tape roll 571 is bent toward the rear edge 507 of the wall 504 by the edge portion 512, although this is not shown in the drawings. The friction force between the edge portion 512 and the tube tape 57 therefore may increase, and the force that is necessary for pulling out the tube tape 57 may also increase. Accordingly, a mistake in the positioning of the tube tape 57 during manufacturing may be detected by checking the force that is necessary for pulling out the tube tape 57.

The wall 504 may have a shape other than a cylindrical shape. For example, a circular column or a rectangular column may be provided in the same position as the edge portion 514. It is acceptable for the guide hole 47 not to be provided in the tape cassette 30. In that case, it would be acceptable for the guide shaft 120 not to be provided in the cassette mounting portion 8. At least one vertically oriented slit may be provided in the partition wall 516. It is acceptable for the partition wall 516 not to be provided in the tape cassette 30.

Figure 11:
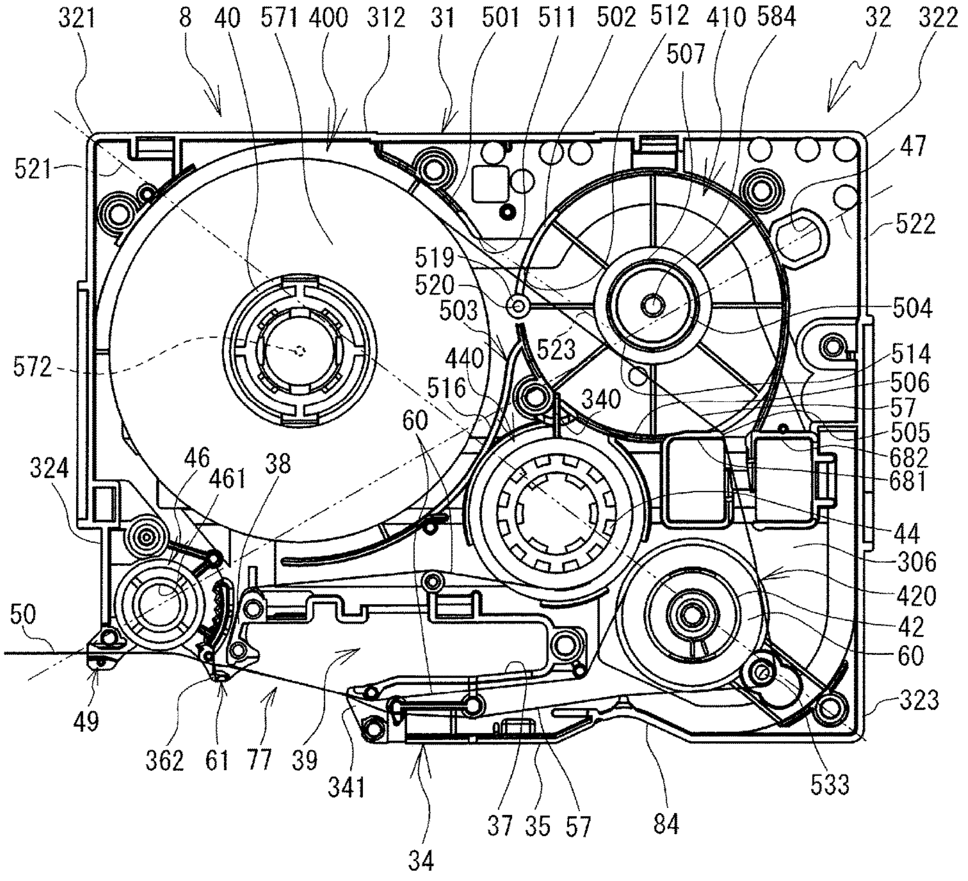
FIG. 11 is a plan view of a tape cassette 32 according to a modified example.

It is acceptable for the portion that is opposite the edge portion 512 and that shapes the feed path not to be the columnar portion 513. For example, instead of a column, the portion that is opposite the edge portion 512 and that shapes the feed path may be a wall portion that is joined to the partition wall 516. The portion that is opposite the edge portion 512 and that shapes the feed path may be a roller 519 that can rotate about an axis that extends in the up-down direction, as in a tape cassette 32 according to a modified example that is shown in FIG. 11. The roller 519 may have a hole that extends in the up-down direction in the center of the roller 519. A column 520 may be positioned inside the hole in the roller 519. The roller 519 may rotate about the column 520. In a case where the roller 519 is provided, the partition wall 516 may be positioned close to the roller 519. In a case where the roller 519 is provided, the friction force between the tube tape 57 and the portion that is opposite the edge portion 512 and that shapes the feed path may be made smaller than in a case where the roller 519 is not provided. The tube tape 57 may thus be fed more smoothly. The printing quality may therefore be improved.

It is acceptable for the tape that is contained in the first tape area 400 not to be the tube tape 57. For example, a printing tape, a heat-sensitive paper tape, or the like may be located in the first tape area 400. Even in those cases, the same sorts of effects can be achieved as in the case of the tube tape 57. In a case where a heat-sensitive paper tape is located in the first tape area 400, it is acceptable for the ink ribbon 60 not to be provided in the cassette case 31.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A tape cassette comprising:

a cassette case that includes a top face, a bottom face, a front face, and a pair of side faces, the pair of side faces extending in a front-rear direction orthogonal to the front face;

a tape containment area, in the cassette case, in which a tape roll is accommodated, the tape roll being a wound tape that is a printing medium;

a first wall portion provided along a portion of an outer perimeter of the tape containment area, the first wall portion being configured to shape a feed path for the tape that extends from the tape roll, the first wall portion including a first edge portion that faces a first surface of the tape;

a guide portion provided downstream from the first wall portion on the feed path, the guide portion being configured to be in contact with the tape regardless of an amount of the tape of the tape roll accommodated in the tape containment area, the guide portion facing a second surface of the tape;

a second wall portion provided between the first wall portion and the guide portion, the second wall portion being configured to shape the feed path, the second wall portion including a second edge portion that faces the first surface of the tape;

a third wall portion provided on an opposite side of the tape from the second wall portion, the third wall portion being configured to shape the feed path, the third wall portion including a third edge portion that faces the second surface of the tape; and a fourth wall portion provided between the second wall portion and the guide portion, the fourth wall portion including a fourth edge portion that faces the first surface of the tape, the second edge portion being provided in a position along a virtual straight line that connects the first edge portion and the fourth edge portion, wherein a length of the fourth wall portion in an up-down direction is longer than a length of the second wall portion in the up-down direction, the up-down direction being orthogonal to the top face and the bottom face.

2. The tape cassette according to claim 1, wherein the third edge portion has a circular columnar shape that extends in an up-down direction in which the top face and the bottom face are opposed to each other.

3. The tape cassette according to claim 1, wherein the tape is configured to be pulled out from the tape roll at a point that is to a rear of a winding center of the tape roll in the front-rear direction, and the third edge portion is positioned to the rear of the winding center of the tape roll in the front-rear direction.

4. The tape cassette according to claim 1, wherein the fourth wall portion has a cylindrical shape.

5. The tape cassette according to claim 1, wherein the third wall portion is a roller that is configured to rotate about an axis that extends in an up-down direction in which the top face and the bottom face are opposed to each other.

6. The tape cassette according to claim 1, wherein the tape is a heat-shrinkable tube.

7. The tape cassette according to claim 1, wherein the fourth edge portion is a curved surface.

8. A tape cassette comprising:

a cassette case that has a rectangular parallelepiped shape, the cassette case including a top face, a bottom face, a front face, and a pair of side faces, the pair of side faces extending in a front-rear direction orthogonal to the front face;

a tape containment area in the cassette case, in which a tape roll is accommodated, the tape roll being a wound tape that is a printing medium;

an arm portion that includes a portion of the front face and that is configured to guide the tape to an exit along a portion of a feed path, the portion of the feed path extending in parallel to the front face;

a rotatable ribbon winding spool provided between the arm portion and the tape containment area in the front-rear direction, the rotatable ribbon winding spool being configured to wind an ink ribbon used for printing on the tape, the tape containment area and the rotatable ribbon winding spool being positioned on a first diagonal line, the first diagonal line connecting a pair of corner portions of the cassette case;

a path shaping portion provided in a position along an outer perimeter of the tape containment area, the path shaping portion being configured to shape the feed path for the tape; and a partition wall provided between the rotatable ribbon winding spool and the tape roll, the partition wall extending from the path shaping portion along a portion of the outer perimeter of the tape containment area, the partition wall intersecting a virtual line connecting a winding center of the tape roll and a rotational center of the rotatable ribbon winding spool.

9. The tape cassette according to claim 8, further comprising:

a roller provided in one corner portion of two corner portions that are positioned on a second diagonal line, the second diagonal line intersecting the first diagonal line, the roller having a first opening that extends in an up-down direction in which the top face and the bottom face are opposed to each other, a portion of an outer circumferential face of the roller being exposed on a front side of the cassette case; and a second opening provided in another corner portion of the two corner portions that are positioned on the second diagonal line, wherein the partition wall is provided along a virtual line that connects the first opening and the second opening.

10. The tape cassette according to claim 8, further comprising:

a first wall portion is provided along a portion of the outer perimeter of the tape containment area, the first wall portion being configured to shape the feed path for the tape that extends from the tape roll, the first wall portion including a first edge portion that faces a first surface of the tape;

a guide portion provided downstream from the first wall portion on the feed path, the guide portion being configured to be in contact with the tape regardless of an amount of the tape of the tape roll accommodated in the tape containment area, the guide portion facing a second surface of the tape;

a second wall portion provided on an opposite side of the tape from the path shaping portion, the second wall portion being provided between the first wall portion and the guide portion, the second wall portion being configured to shape the feed path, the second wall portion including a second edge portion that faces the first surface of the tape; and a third wall portion provided between the second wall portion and the guide portion, the third wall portion including a third edge portion that faces the first surface of the tape, wherein the path shaping portion includes an edge that faces the second surface of the tape, and wherein the second edge portion is provided in a position along a virtual straight line that connects the first edge portion and the third edge portion.

11. The tape cassette according to claim 10, wherein the third wall portion has a cylindrical shape.

12. The tape cassette according to claim 8, wherein the path shaping portion has a circular columnar shape that extends in an up-down direction in which the top face and the bottom face are opposed to each other.

13. The tape cassette according to claim 8, wherein the tape is configured to be pulled out from the tape roll at a point to a rear of the winding center of the tape roll in the front-rear direction, and the path shaping portion is positioned to the rear of the winding center of the tape roll in the front-rear direction.

14. The tape cassette according to claim 8, wherein the tape is a heat-shrinkable tube.

* * * * *